United States Patent [19]

Abt et al.

[11] Patent Number: 4,853,784

[45] Date of Patent: Aug. 1, 1989

[54] VIDEO SWITCHER WITH INDEPENDENT PROCESSING OF SELECTED VIDEO SIGNALS

[75] Inventors: John Abt; Ronnie D. Barnett; James E. Blecksmith, all of Nevada City; Kevin D. Windrem, Grass Valley; Neil R. Olmstead; Richard A. Jackson, both of Nevada City; Peter D. Symes, Grass Valley; Richard S. Bannister, Grass Valley; Thomas A. Grancey, Grass Valley; Richard A. Frasier, Grass Valley, all of Calif.

[73] Assignee: The Grass Valley Group, Inc., Grass Valley, Calif.

[21] Appl. No.: 157,675

[22] Filed: Feb. 19, 1988

[51] Int. Cl.[4] .................. H04N 5/268; H04N 5/272; H04N 9/74

[52] U.S. Cl. .................................. 358/181; 358/183; 358/22

[58] Field of Search ................ 358/22, 181, 182, 183

[56] References Cited

U.S. PATENT DOCUMENTS

| | | | |
|---|---|---|---|
| 4,222,076 | 9/1980 | Knowlton | 358/133 |
| 4,360,831 | 11/1982 | Kellar | 358/183 |
| 4,447,886 | 5/1984 | Meeker | 358/133 |
| 4,758,892 | 7/1988 | Bloomfield | 358/183 |

Primary Examiner—James J. Groody
Assistant Examiner—John K. Peng
Attorney, Agent, or Firm—Francis I. Gray; John Smith-Hill

[57] ABSTRACT

A video switcher comprises a source selector having a plurality of input terminals for connection to a plurality of video sources respectively, and at least two output terminals. At least two processing channels each have an input terminal connected to an output terminal of the source selector and also have an output terminal. A video combiner has video input terminals connected to the output terminals of the processing channels and is operative to combine the output signals provided by the processing channels in dependence upon priority signals.

11 Claims, 3 Drawing Sheets

VIDEO SWITCHER WITH INDEPENDENT PROCESSING OF SELECTED VIDEO SIGNALS

BACKGROUND OF THE INVENTION

This invention relates to a video switcher with independent processing of selected video signals.

FIG. 1 illustrates a conventional video mixing system, or switcher, in simplified block form. The FIG. 1 switcher comprises a source selector 2 which receives multiple video input signals, e.g. from external video signal sources, and provides selected ones of these input signals to mix/effect amplifiers (M/Es) 4. Each M/E receives at least two video input signals and combines them under control of signals provides by an operator interface 6. A typical M/E that receives four video input signals is shown in FIG. 2. FIG. 2 illustrates an M/E in functional form, and does not necessarily represent its physical arrangement.

The four video input signals received by the FIG. 2 M/E are a title signal, a foreground signal and two background signals. The title video signal is associated with a title key which defines the area of the picture field that is occupied by a title image, and similarly the foreground video signal has a foreground key which defines the area of the picture field occupied by a foreground image. The two background signals are generally full field video signals and do not have keys associated there with.

It will be appreciated that the paths from the sources that provide signals having keys associated therewith must be dual paths, one path for the video signal and one for the key.

The four video signals received by the M/E shown in FIG. 2 are combined in a background mixer 42, a video key mixer 43, and a title key mixer 44 under control of signals provided by the operator interface through a background mixer control 45, a video key mixer control 46, and a title key mixer control 47. The output video signal represents a picture consisting of a title, a foreground image and a background image. The background image may be represented by a selected one of the background signals or by a mix of the two background signals. The title appears to be in front of the foreground, and the foreground appears to be in front of the background.

In a conventional switcher, an output video signal having contributions from a large number of input video signals (many more than four) is created by use of multiple M/Es. Each M/E 4 is capable of receiving several video signals and combining them, and the output signal provided by the M/E can be re-entered into the source selector as shown at 8 so that it serves as an input for another M/E. In FIG. 1, each M/E 4 is shown as having re-entry connections to each other M/E 4 and to a program/preset M/E 10.

A video signal representing a complex scene may be produced by recording a video signal, playing it back and modifying it in some manner using an M/E, and re-recording the modified signal. This sequence of playing back, modifying and re-recording the video signal is repeated until the desired composite picture is obtained. The composite picture may be regarded as being composed of multiple layers, some partially concealing others and being concealed by yet others, with the positions of the boundaries between the visible portions of the various layers being variable under operator control. In producing a signal representing a picture composed of multiple layers, it is desirable that several layers be added in a single playback and re-record pass to the picture represented by the signal that was previously recorded, instead of adding only one layer on each pass.

Conventional M/Es operate by performing one or more two-channel mixes. Each mixer receives two video signals, e.g. the video signal that was recorded on the previous pass and is being played back and an external video signal that is to be combined with the previously-recorded signal, and acts on them in a complementary fashion in dependence on a mix control signal. For example, as the amplitude of the contribution of one input video signal (video A) to the output signal is increased, the amplitude of the contribution of the other input video signal (video B) is necessarily decreased. Accordingly, the operator of the switcher is not able to consider the effect of an action on one input video signal in isolation, and must also consider the effect that the same action is having on the other input video signal. If the operator is attempting to manipulate multiple layers, the interaction between layers makes it difficult to ensure that the desired effect is obtained.

SUMMARY OF THE INVENTION

A preferred video switcher embodying the present invention comprises a source selector having a plurality of input terminals for connection to a plurality of video signal sources respectively, for receiving respective external video signals, and at least first and second output terminals at which selected external video signals may be made available. The first and second output terminals of the source selector are connected to input terminals of first and second processing channels respectively. Each processing channel comprises a circuit for acting on a video signal received at its input terminal to limit the video signal in the amplitude domain and/or the spatial domain without transforming the video signal in the spatial domain and without influencing the video signal received at the input terminal of any of the other processing channels. Each processing channel has an output terminal at which it provides a processed video signal. The output terminals of the processing channels are connected to a video combiner which combines the processed video signals under control of priority signals.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
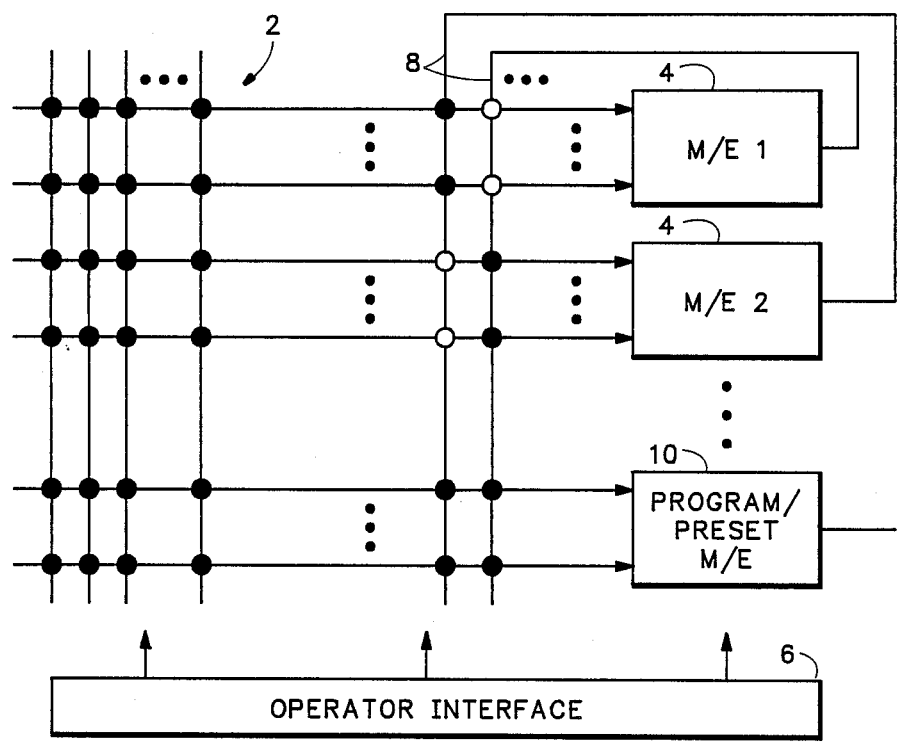
FIG. 1 is a simplified block diagram of a conventional video switcher.
Figure 2:
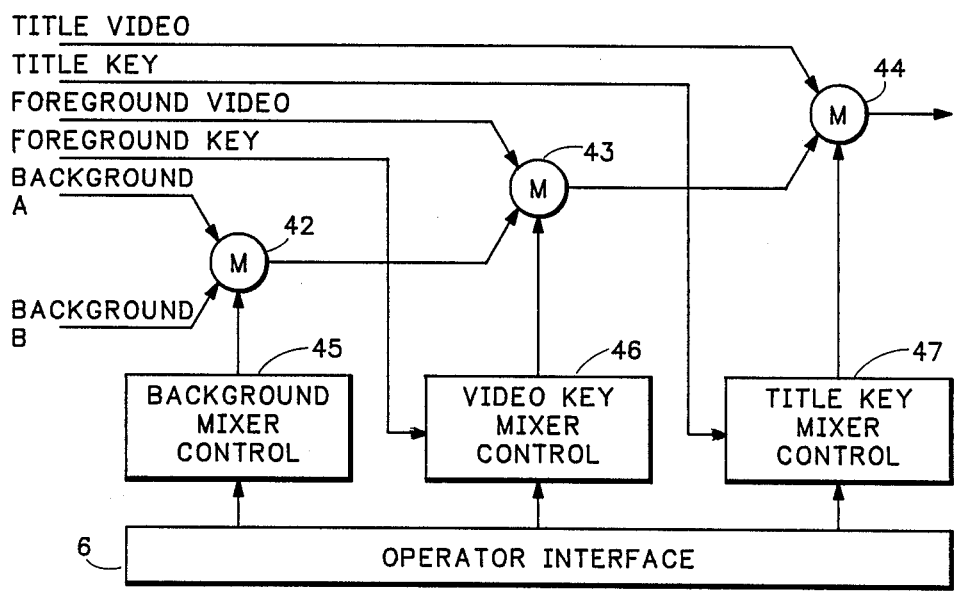
FIG. 2 is a block diagram of a mix/effects amplifier which forms part of the conventional switcher.
Figure 3:
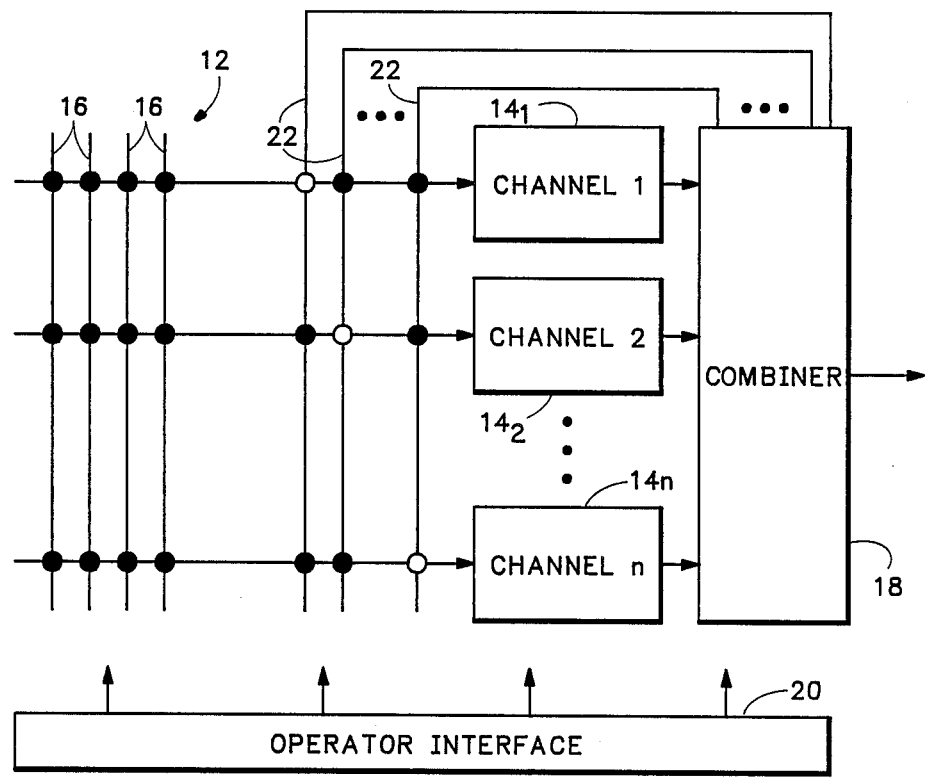
FIG. 3 is a block diagram of a video switcher embodying the present invention.

The switcher illustrated in FIG. 3 comprises a source selector 12 and multiple processing channels $14_1$ $14_2$ . . . $14_n$. The source selector 12 has a plurality of input terminals 16, for connection to respective video signal sources, and has one output terminal connected to each processing channel. Accordingly, each channel 14 can be connected to receive the signal present at one of the input terminals of the source selector. Each channel 14 provides an output signal to a video combiner 18, which combines the signals received from the channels 14 under control of priority signals received from an operator interface 20 and provides an output video signal.

Each video path illustrated in FIG. 3 is a dual path, comprising one path for the video signal and one for an associated key. The key associated with a given video signal defines a limited area of the picture field. The key path might not always be used upstream of the processing channel, but it is nevertheless provided.

In the composite image represented by the output signal of the combiner 18, the images represented by the various input signals appear as layers in order of decreasing priority: the image represented by a signal having a given priority appears in front of all images represented by signals having lower priority and behind all images represented by signals having higher priority. The output signals provided by the processing channels 14 are shaped video signals. (A shaped video signal is a video signal that has been multiplied by its associated key, and therefore for any location at which the key is logical 0, the corresponding shaped video signal has an amplitude of zero. An unshaped video signal is a video signal that has not been multiplied by a key and therefore may have an amplitude other than zero outside the area defined by the key.) The value of the key associated with a given video signal determines the transparency of the image represented by that signal: if the key is logical 1, the image is opaque, and if it is logical 0, the image is transparent. If the image represented by a signal having a given priority is at least partially transparent, a partially opaque image represented by a signal having a lower priority can be seen through the image represented by the higher priority signal.

Figure 4:
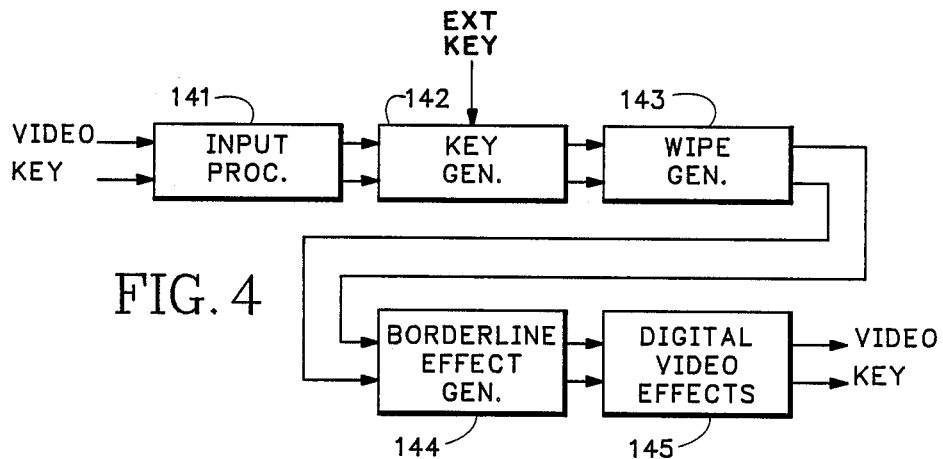
FIG. 4 is a more detailed block diagram of part of the FIG. 3 switcher.

One of the processing channels 14 is illustrated in FIG. 4. As shown in FIG. 4, a typical processing channel 14 comprises an input processor 141 for receiving an input video signal in any one of several forms and placing it in a form suitable for processing by the switcher. In the case of the illustrated switcher, the processing channel 14 acts on the video signals in digital component form. If, for example, the input signal is in analog composite form, the input processor 141 digitizes the composite video signal and decodes it, and also digitizes the key signal (if one is received with the video signal).

The output signal provided by the input processor 141 is applied to a key generator 142 which ensures that a key is provided for processing with the video signal if one was not received with the video signal, or may generate a new key signal if one was received with the video signal. The key generator is able to operate in any of three modes in dependence on a control signal received from the operator interface. In the chrome key mode it generates a key that defines the area of the field over which the image represented by the video signal has a selected hue, e.g. blue, and a saturation above a selected level. In the luminance key mode, the key generator generates a key that defines the area of the field over which the luminance of the image represented by the video signal exceeds a selected level. In the external key mode, the key generator does not itself generate a key but transmits a key signal received from an external source. If the video signal is a full field signal received without an associated key, the key generator might generate a key defining a full field. The output signal provided by the key generator is shaped. Therefore, if the video signal received by the key generator 142 is an unshaped video signal, it is multiplied by the key in the key generator.

The processing channel also comprises circuits for modifying the video signal provided by the key generator in a manner controlled by the operator of the switcher through the operator interface 20. As shown in FIG. 4, these circuits might comprise a wipe generator 143, a Borderline effect generator 144 (Borderline is a registered trademark of The Grass Valley Group, Inc.), and a digital video effects generator 145. The wipe generator is used to perform effects that are conventionally known as dissolves and wipes. In a conventional switcher, these effects are performed using a two-input mixer which receives two input video signals and also receives a mix control signal, representing a mix coefficient which has a range from 0 to 1 and is adjustable under operator control. The mixer multiplies one of the input video signals by the mix coefficient, multiplies the other input video signal by the complement of the mix coefficient, and provides an output video signal which is the sum of the two products. The nature of the effect depends on the waveform of the mix control signal. If the mix coefficient changes from one to zero (or vice versa) over an interval that is much shorter than one frame interval, and the location in the field at which the change takes place sweeps through the field over multiple frames, the effect is a wipe from the image represented by one input video signal to the image represented by the other input signal. On the other hand, if the mix coefficient changes from one to zero (or vice versa) over an interval that is much longer than one frame interval, the effect is a dissolve from one image to the other.

In the FIG. 3 switcher, wipes and dissolves are effected by adjusting the value of the key. The value of the key associated with an input video signal determines the contribution that the image represented by the input video signal can potentially make to the picture represented by the output video signal, subject to the priority of the input video signal. By changing the value of the key, wipes and dissolves can be produced. In a wipe, the value of the key changes from to 1 in a manner that depends on a spatial pattern on the screen and therefore the output signal provided by the wipe generator switches back and forth between the input signal and a background level. In the case of a dissolve, the value of the key is gradually changed from 0 to 1 over several fields, and therefore the transparency of the image represented by the corresponding shaped video signal increases (or decreases) progressively and reveals (or occludes) the image represented by the background level. Accordingly, the wipe generator 143 includes a circuit for generating a control signal which is multiplied against the key signal. This circuit may be similar to a circuit used in a conventional switcher to generate the mix control signal that is used to control mixing of two input video signals.

The Borderline effect generator 144 is typically used to provide a visually-contrasting border about characters when the background scene against which the characters are shown contains high spatial frequencies and/or movement, to enhance the legibility of the characters. The outlines of the characters are defined by a key, and the Borderline effect generator defines a border area by reference to the transition between a region where the key is one and a region where the key is zero. The Borderline effect generator includes a matte generator which provides the video signal that is inserted into the border area. The Borderline effect generator 144 shown in FIG. 4 operates in a similar fashion to the Borderline effect generator of a conventional switcher.

The digital video effects generator may be used to carry out spatial transformations on the output signal provided by the Borderline effect generator 144. The types of spatial transformations that can be performed using known digital video effects generators include translations, rotations, and compressions.

A typical processing channel might include circuits for providing effects additional to those described with reference to FIG. 4, and some channels might have a greater repertoire of effects than other channels.

Figure 5:
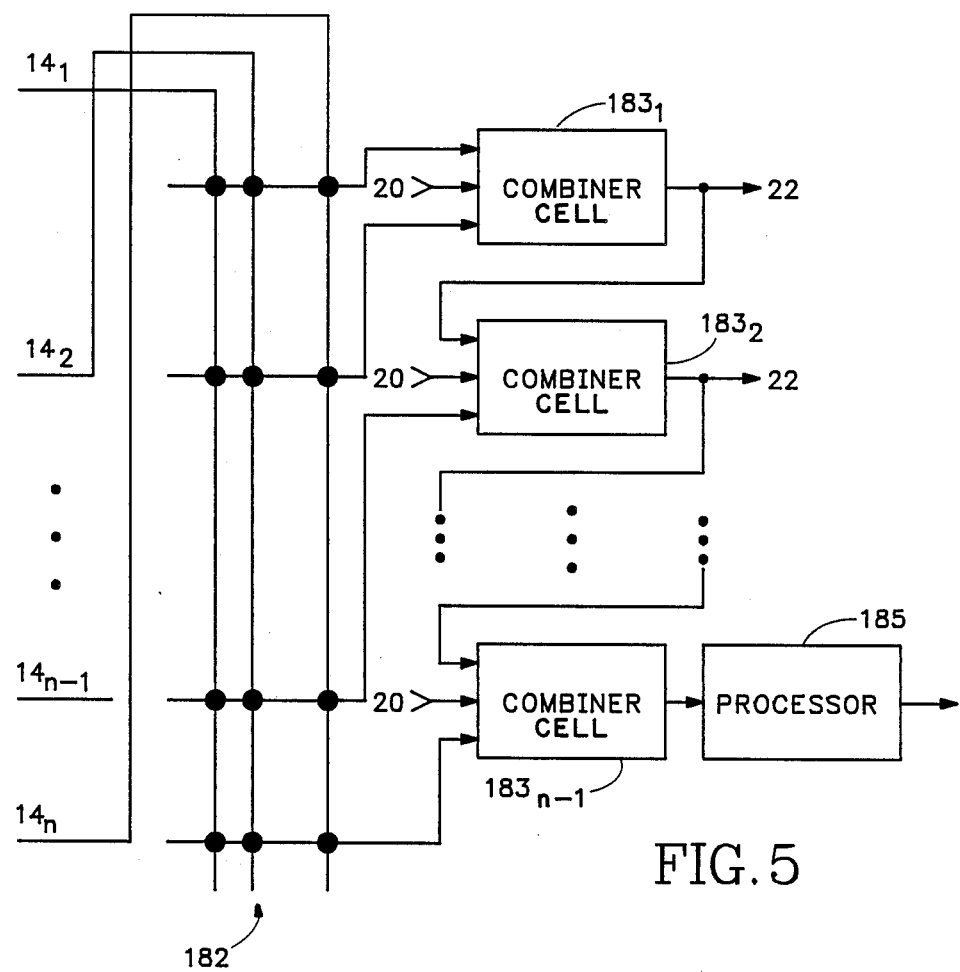
FIG. 5 is a more detailed block diagram of another part of the FIG. 3 switcher.
Figure 6:
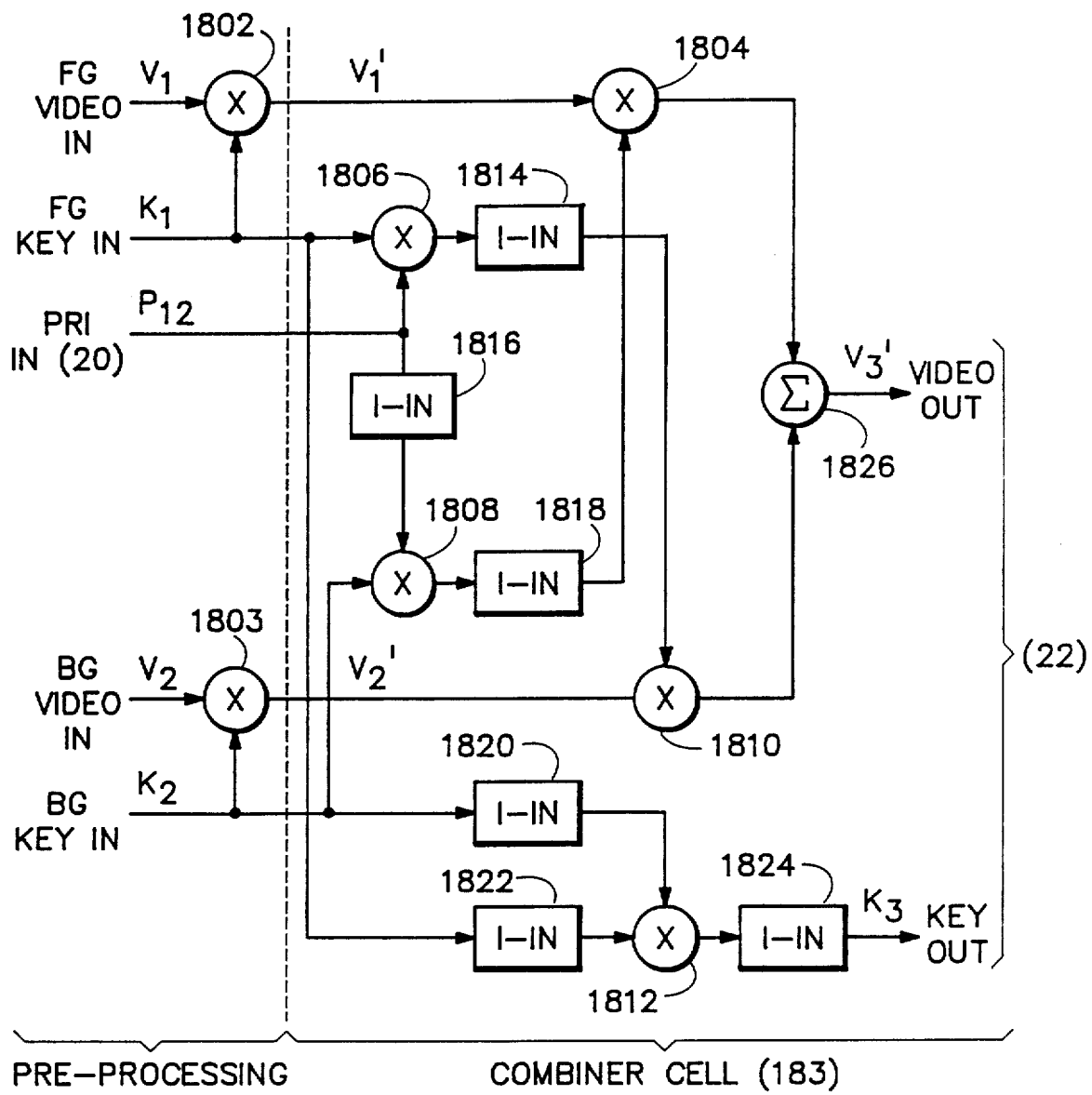
FIG. 6 is a block diagram of a combiner cell for combining two video signals with associated key signals.

The output signals provided by the processing channels 14 are applied to the combiner 18. The combiner 18 receives all the video signals and associated keys provided by the processing channels 14, and also receives priority signals from the operator interface 20, and combines the input video signals in order to produce an output video signal. As shown in FIG. 5 (in which the video and key signal paths are not shown separately), the combiner 18 may be implemented by an n×n video router 182 (where n is the number of processing channels 14) and (n−1) two-input combining circuits 183. In such an implementation of the combiner 18, the video router 182 enables the shaped video signal and associated key provided by any one of the processing channels 14 to be applied to any one of the combining circuits 183. Each combining circuit 183 may be a combiner cell as shown in FIG. 6. Each combiner cell has multipliers 1804, 1806, 1808, 1810 and 1812, complement circuits 1814, 1816, 1818, 1820, 1822 and 1824, and a summer 1826. The illustrated combiner cell 183 operates in the digital domain with parallel data, and therefore all the signal lines that are illustrated would in fact be multiple conductor lines. Additional circuitry would be required to assure proper timing relationships among the various signals, but such matters are well within the skill of the art and therefore are not shown and will not be further described.

The input signals of the combiner cell comprise two shaped video signals $V_1'$ and $V_2'$, associated key signals $K_1$ and $K_2$, and a priority signal $P_{12}$. The levels of the key signals $K_1$ and $K_2$ and the level of the priority signal $P_{12}$ are normalized to have maximum and minimum values that can be represented numerically as 1 and 0. Also, the video signals $V_1'$ and $V_2'$ have the same maximum and minimum values. Additional multipliers 1802 and 1803 are provided upstream of the combiner for generating the shaped video signals $V_1'$ and $V_2'$ from unshaped video signals $V_1$ and $V_2$ and the associated key signals $K_1$ and $K_2$ if necessary. The combiner cell provides a shaped output video signal $V_3'$ and an output key signal $K_3$. It can readily be seen that the output video signal is given by the equation $$V_3' = V_1'[1-K_2(1-P_{12})] + V_2'(1-K_1P_{12})$$

and that the output key signal is given by $$K_3 = 1-(1-K_1)(1-K_2).$$

The value of $P_{12}$ determines the weighting factors that are applied to the two video signals $V_1'$ and $V_2'$. If $P_{12}$ is equal to zero, this implies that the $V_2$ scene is in the foreground of the composite scene and that the $V_1$ scene is in the background, and vice versa if $P_{12}$ is equal to one.

For $P_{12}=0$, then $$V_3' = V_1'(1-K_2) + V_2'$$

The value of $K_2$ defines areas in which the $V_2$ scene contributes to the composite scene. If $K_2=1$, the contribution of $V_1$ to the composite scene is zero and therefore the $V_2$ scene completely obscures the $V_1$ scene. If $K_2=0$, $V_2'=0$ and therefore there is no contribution from $V_2$ and $V_1$ is allowed to pass to $V_3'$ unaltered.

For $P_{12}=1$, then $$V_3' = V_2'(1-K_1) + V_1'$$

The value of $K_1$ defines areas in which the $V_1$ scene contributes to the composite scene. If $K_1=1$, the contribution of $V_2$ to the composite scene is zero and therefore the $V_1$ scene completely obscures the $V_2$ scene. If $K_1=0$, there is no contribution from $V_1$ and $V_2$ is allowed to pass to $V_3'$ unaltered.

For $P_{12}=0.5$, then $$V_3' = V_1'(1-K_2/2) + V_2'(b\ 1-K_1/2)$$

Where $K_2=0$, $V_1'$ is passed unaltered; where $K_1=0$, $V_2'$ is passed unaltered; and where $K_2>0$ and $K_1>0$, the relative opacities of the $V_1$ and $V_2$ scenes are determined by the ratio of $K_1$ and $K_2$.

As $P_{12}$ increases from zero the relative depths of the $V_1$ and $V_2$ pixels in the composite image change, from the $V_2$ pixel appearing in front of the $V_1$ pixel, through the two pixels appearing to be at the same depth (at $P_{12}=0.5$), to the $V_1$ pixel appearing in front of the $V_2$ pixel. It will therefore be seen that the priority signal $P_{12}$ makes it possible to determine which of the component scenes will appear as the foreground scene in the composite picture. By changing the value of $P_{12}$, the composite picture can be changed so that a component scene is the foreground scene at one time and is the background scene at another time.

The two shaped video signals and associated keys that are received by the combiner cell $183_1$ are each provided by the video router. Each other combiner cell receives one shaped video signal and associated key from the video router and the output video signal and associated key from the previous combiner cell.

The output video signal and associated key provided by any one of the combiner cells $183_1 \ldots 183_{n-2}$ may be returned to a re-entry input terminal 22 of the source selector 12, whereby they can be applied to the input of any of the other processing channels for carrying out further processing. A re-entered video signal provided by the combiner 18 is, of course, in digital component form and need not be processed by the input processor of the channel that receives it.

A re-entered video signal undergoes processing delay through the processing channels before being combined with a video signal received from one of the terminals 16, whereas the latter signal undergoes processing delay through only one channel. Therefore, when a video signal is re-entered the input processors of channels that receive signals directly from the terminals 16, i.e. without being re-entered, impose an additional processing delay on those signals in order to bring them into synchronism with the re-entered signal.

The output video signal and associated key provided by the last combiner cell $183_{n-2}$ are applied to an output processor 185. The output video signal of the combiner 18 is taken from the output processor 185, which converts the video signal received from the combiner cell $183_{n-1}$ to the form required by the apparatus downstream of the switcher. For example, the output processor 185 might convert the digital component signal received from the combiner cell $183_{n-1}$ into analog composite form. The output processor might also convert the shaped video signal received by the output processor into unshaped form, in the manner described in the co-pending application. The output signal provided by the output processor may be applied to a monitor to allow the operator of the switcher to observe the effect being obtained.

By use of a processing channel in which a single video signal is processed, and combining the video signals after they have been processed, the operator of the switcher is able to ensure that each video layer has the desired appearance, without being distracted by having to consider the interaction between video layers.

It will be appreciated that the present invention is not restricted to the particular embodiment that has been described and illustrated, and that variations may be made therein without departing from the scope of the invention as defined in the appended claims and equivalents thereof. For example, the invention is not restricted to the processing channel being able to perform the particular functions that have been described, or to these functions being performed in the order described. Moreover, the invention is not limited to the combiner architecture that has been described. A combiner may be constructed otherwise than by using two-input combiner cells. A combiner may also be provided by including a combiner cell and an output processor in each processing channel, with the combiner cells being connected in a loop. In the event that a shaped video signal is required for application to the combiner, the shaping need not be done in the key generator but may be done at a location downstream of the key generator, for example at the input to the combiner itself. It is necessary only that the shaping be carried out before combining takes place.

We claim:

1. A video switcher comprising:
   a source selector having a plurality of input terminals for connection to a plurality of video sources respectively, for receiving respective external video signals, and at least first and second output terminals at which selected external video signals may be made available.
   at least first and second processing channels having input terminals connected to the output terminals respectively of the source selector and each having an output terminal, each of the processing channels comprising a circuit for acting on a video signal received by the processing channel to limit the video signal in at least one of the amplitude domain and the spatial domain without transforming the video signal in the spatial domain, and
   video combiner means having video signal input terminals connected to the output terminals of the processing channels, the video combiner means being operative to combine the output signals provided by the processing channels in dependence upon a priority signal.

2. A video switcher according to claim 1, wherein at least the first processing channel further comprises a circuit for acting on a video signal received by the first processing channel to transform the video signal in the spatial domain.

3. A video switcher according to claim 1, wherein at least the first processing channel further comprises a circuit for generating a key signal.

4. A video switcher according to claim 3, wherein the circuit for generating a key signal is responsive to the video signal received by the first processing channel representing a selected hue.

5. A video switcher according to claim 3, wherein the circuit for generating a key signal is responsive to the video signal received by the first processing channel representing a selected luminance level.

6. A video switcher according to claim 3, wherein the circuit for generating a key signal is responsive to an external key signal received by the first processing channel.

7. A video switcher according to claim 1, wherein the source selector has at least first and second re-entry terminals connected to the output terminals of the video combiner means, the source selector being operative selectively to connect either the first re-entry terminal to the input terminal of the second processing channel or the second re-entry terminal to the input terminal of the first processing channel.

8. A video switcher according to claim 1, wherein the source selector has a plurality of re-entry terminals for connecting one of an equal plurality of output terminals of the video combiner means to the input terminal of one of the processing channels.

9. A video switcher according to claim 1, wherein the video combiner means have a number of video signal input terminals equal to the number of processing channels, a video signal output terminal, and a plurality of control input terminals for receiving respective priority signals, for establishing priority relationships among the video signal input terminals.

10. A video switcher according to claim 9, comprising n processing channels, where n is an integer greater than two, and wherein the video combiner means comprise (n−1) two-input combiners each having first and second signal input terminals for receiving respective video signals, a control input terminal for receiving a priority signal, and an output terminal for providing as an output video signal a sum of the input video signals received at the first and second signal input terminals, weighted in accordance with the priority signal received at the control input terminal, and the video combiner means further comprise a video router having n input terminals connected to the output terminals of the processing channels respectively and n output terminals, the video router being operative to connect its input terminals selectively to its output terminals respectively, the first and second output terminals of the output router being connected to the first and second signal input terminals of the first two-input combiner, the third through nth output terminals of the video router being connected to the first input terminals of the second through (n−1)th two-input combiners respectively, the output terminals of the first through (n−2)th two-input combiners being connected to the second input terminals of the second through (n−1)th two-input combiners, and the output terminal of the (n−1)th two-input combiner being connected to the video signal output terminal of the video combiner means.

11. A video switcher according to claim 9, comprising n processing channels, where n is an integer greater than two, and wherein the video combiner means comprise (n−1) two-input combiners each having first and second signal input terminals for receiving respective video signals, a control input terminal for receiving a priority signal, and an output terminal for providing as an output video signal a sum of the input video signals received at the first and second signal input terminals, weighted in accordance with the priority signal received at the control input terminal, the output terminals of the first and second processing channels being connected to the first and second signal input terminals of the first two-input combiner, and the output terminals of the third through nth processing channels being connected to the first input terminals of the second through (n−1)th two-input combiners respectively, the output terminals of the first through (n−2)th two-input combiners being connected to the second input terminals of the second (n−1)th two input combiners, and the output terminal of the (n−1)th two-input combiner being connected to the video signal output terminal of the video combiner means.

* * * * *

UNITED STATES PATENT AND TRADEMARK OFFICE
CERTIFICATE OF CORRECTION

PATENT NO.  : 4,853,784

DATED       : August 1, 1989

INVENTOR(S) : Richard A. Jackson, et al

It is certified that error appears in the above-identified patent and that said Letters Patent is hereby corrected as shown below:

Fig 6 of the drawings should be added as shown on the attached sheet.

Signed and Sealed this

Eighteenth Day of December, 1990

Attest:

HARRY F. MANBECK, JR.

Attesting Officer

Commissioner of Patents and Trademarks